(12) United States Patent
Watahiki et al.

(10) Patent No.: US 6,765,590 B1
(45) Date of Patent: Jul. 20, 2004

(54) AV DEVICE CONTROL APPARATUS

(75) Inventors: Tomoaki Watahiki, Takatsuki (JP); Koichi Matsumura, Settsu (JP); Masao Ikezaki, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 315 days.

(21) Appl. No.: 09/651,281

(22) Filed: Aug. 30, 2000

(30) Foreign Application Priority Data

Aug. 31, 1999 (JP) .......................................... H11-245819

(51) Int. Cl.[7] ................................................. G09G 5/00
(52) U.S. Cl. ...................... 345/716; 345/719; 345/727; 345/733; 345/736
(58) Field of Search .............................. 345/716, 704, 345/719, 722, 727, 731, 733, 736, 737, 725; 725/37–61

(56) References Cited

U.S. PATENT DOCUMENTS

| | | | | |
|---|---|---|---|---|
| 5,956,025 | A | * 9/1999 | Goulden et al. | 345/716 |
| 6,023,705 | A | * 2/2000 | Bellinger et al. | 707/200 |
| 6,052,750 | A | * 4/2000 | Lea | 710/72 |
| 6,100,812 | A | 8/2000 | Tanaka et al. | 340/825.37 |
| 6,118,450 | A | * 9/2000 | Proehl et al. | 345/810 |
| 6,182,094 | B1 | * 1/2001 | Humpleman et al. | 707/513 |
| 6,201,539 | B1 | * 3/2001 | Miller et al. | 345/765 |
| 6,239,718 | B1 | * 5/2001 | Hoyt et al. | 340/825.22 |
| 6,288,716 | B1 | * 9/2001 | Humpleman et al. | 345/733 |
| 6,441,830 | B1 | * 8/2002 | Duvall et al. | 345/716 |

FOREIGN PATENT DOCUMENTS

| | | | |
|---|---|---|---|
| JP | 5-127853 | 5/1993 | ............. G06F/3/14 |
| JP | 7-147698 | 6/1995 | ............. H04Q/9/00 |
| JP | 7-336778 | 12/1995 | ............. H04Q/9/00 |
| JP | 8-277341 | 9/1996 | ............. G06F/3/033 |
| JP | 9-326799 | 12/1997 | ............. H04L/12/28 |
| JP | 10-271573 | 10/1998 | ............. H04Q/9/00 |
| JP | 10-326173 | 12/1998 | ............. G06F/3/14 |

OTHER PUBLICATIONS

JPO Office Action dated Aug. 19, 2003 with partial translation.

* cited by examiner

Primary Examiner—John Cabeca
Assistant Examiner—Cuong T. Thai
(74) Attorney, Agent, or Firm—Smith, Gambrell & Russell, LLP (57) ABSTRACT

An AV device controller for controlling networked devices with a graphical user interface (GUI). An interface section obtains GUI information from a controlled device. A GUI storage section stores the GUI information. A GUI display section displays GUI parts. An input device selects the GUI parts. By selecting a GUI part displayed on the GUI display section with the input device, a predetermined processing assigned to the GUI part is started.

10 Claims, 9 Drawing Sheets

| ID | File name | Display position | Display size | Processing content |
|---|---|---|---|---|
| 0 | Playback | 100,120 | 50×50 | Transmit playback command |
| 1 | Stop | 100,180 | 50×50 | Transmit stop command |
| | | | | |
| | | | | |
| | | | | |

Fig. 9

| ID (905) | File name (901) | Display position (902) | Display size (903) | Processing content (904) | Identifier of device (906) |
|---|---|---|---|---|---|
| 0 | Playback | 100,120 | 50×50 | Transmit VCR playback command | 1 |
| 1 | Stop | 100,180 | 50×50 | Transmit VCR stop command | 1 |
| 2 | Playback | 150,120 | 45×45 | Transmit CD playback command | 2 |
|   |   |   |   |   | 2 |
|   |   |   |   |   | 3 |
|   |   |   |   |   | 3 |

AV DEVICE CONTROL APPARATUS

BACKGROUND OF THE INVENTION

1. Field of the Invention

The present invention relates to a controller for various kinds of networked AV devices and a method of displaying a graphical user interface on the controller.

2. Related Art of the Invention

Conventional AV device controllers are included in each individual television or video cassette recorder (VCR), and the number of buttons on the controllers has increased with improvement in the performance of the AV devices. A method to control a plurality of AV devices with one controller is to control a television or a VCR by obtaining an ID code from the television or the VCR and identifying the ID as described in Japanese Patent Application No. Hei 9-68095.

Under these circumstances, the following problems arise:

Since a plurality of AV devices are present in each home and the controllers included therein are also present, it is difficult to identify the AV device to which each controller belongs. In addition, with improvement in the performance of the AV devices, the controllers have become complicated and difficult to use.

Even when the controllers are integrated into one controller as described in Japanese Patent Application No. Hei 9-68095, it is difficult to identify the function assigned to each button.

To solve these problems, an object of the present invention is to provide a controller capable of controlling a plurality of AV devices with one controller, and a method of displaying a graphical user interface on the controller, said method being characterized in that anyone can easily operate AV devices or the user can customize the graphical user interface.

SUMMARY OF THE INVENTION

According to a first aspect of the present invention, to solve the above-mentioned problems, means is provided for obtaining, as GUI information of controlled devices on an AV device network, GUI image information, GUI display position information and information on commands transmitted to the controlled devices. According to the first aspect of the present invention, since the GUI information of various controlled devices on the AV device network can be obtained, the devices on the AV device network can be easily controlled with one controller.

According to a fourth aspect of the present invention, to solve the above-mentioned problems, the following methods are provided: a method in which levels are provided for GUI display and the user can make level selection; and a method in which parts are displayed in accordance with the selected level. According to the fourth aspect of the present invention, since the user selects from among, for example, levels from a level to display minimum necessary GUIs such as playback, stop and rewind of a VCR to a level to display a multiplicity of GUIs such that all the functions of a VCR are displayed and inputs the selected level and after the selected level is input, the desired GUIs are displayed at the display level, a controller being easy for the user to use can be constructed.

According to a fifth aspect of the present invention, to solve the above-mentioned problems, the following methods are provided: a method in which levels are provided for GUI display and the user can continuously and flexibly make level selection; and a method in which display is performed according to the selected level. According to the fifth aspect of the present invention, since operations of zoom in and zoom out, for example, between a level to display minimum necessary GUIs such as playback, stop and rewind of a VCR and a level to display a multiplicity of GUIs such that all the functions of the VCR are displayed can be freely performed and GUIs are displayed in GUI positions desired by the user at a display level desired by the user, a controller being easy for the user to use can be constructed.

According to a sixth aspect of the present invention, to solve the above-mentioned problems, a method in which the user can freely customize the layout of the displayed GUIs is provided. According to the sixth aspect of the present invention, since the user can move GUI parts to which functions such as playback, stop and rewind of a VCR are assigned to desired positions on the GUI display screen, a controller being easy for the user to use can be constructed.

According to a seventh aspect of the present invention, to solve the above-mentioned problems, means is provided for obtaining, as GUI information of a plurality of controlled devices on an AV device network, GUI image information, GUI display position information, information on commands transmitted to the controlled devices and the device identifiers of the controlled devices, and a method is provided in which the user can freely customize the layout of GUI parts of a plurality of devices. According to the seventh aspect of the present invention, for example, on an AV network to which a CD player (CD) and a minidisk player (MD) are connected, the user can freely dispose the GUI part to which the recording function of the MD is assigned next to the GUI part to which the playback function of the CD is assigned. As described above, an AV network controller can be constructed that is easy for the user to use and in which all the devices on an AV device network are controlled with one controller.

BRIEF DESCRIPTION OF THE DRAWINGS

[FIG. 1]

A block diagram of a controller according to a first embodiment of the present invention;

[FIG. 2]

A block diagram of a controller according to a second embodiment of the present invention;

[FIG. 3]

A view of the screen of a graphical user interface according to the second embodiment of the present invention;

[FIG. 4]

A block diagram of a controller according to a third embodiment of the present invention;

[FIG. 5]

A view of the screen of a graphical user interface according to the third embodiment of the present invention;

[FIG. 6]

A block diagram of a controller according to a fourth embodiment of the present invention;

[FIG. 7]

A view of the screen of a graphical user interface according to the fourth embodiment of the present invention;

[FIG. 8]

A view showing an example of the configuration of GUI information in the first embodiment of the present invention; and

[FIG. 9]

A view showing an example of the configuration of GUI information in a fifth embodiment of the present invention.

DESCRIPTION OF SYMBOLS

101 Controller
102 Interface section
103 GUI storage section
104 GUI display section
105 Input means
201 GUI level setting section
202 GUI position setting section
301 Level setting screen
302 Zoomed out GUI display screen
303 Zoomed in GUI display screen
304 GUI level selection bar
305 Zoom-out selection
306 Zoom-in selection
401 Level selecting means
501 Zoomed out GUI display screen
502 Zoomed in GUI display screen
503 Position selection
504 Continuous progress
601 GUI part position storage section
701 GUI display screen before a GUI part is moved
702 GUI display screen after a GUI part is moved
703 GUI part before moved
704 GUI part after moved
801 File name of GUI part
802 Display position of GUI part
803 Display size of GUI part
804 Processing content
805 Identifier of GUI part
806 GUI part storage table
901 File name of GUI part
902 Display position of GUI part
903 Display size of GUI part
904 Processing content
905 Identifier of GUI part
906 Identifier of device
907 GUI part storage table

PREFERRED EMBODIMENTS OF THE INVENTION (First Embodiment)

Hereinafter, a controller according to a first embodiment of the present invention will be described with reference to the drawings.

Figure 1:
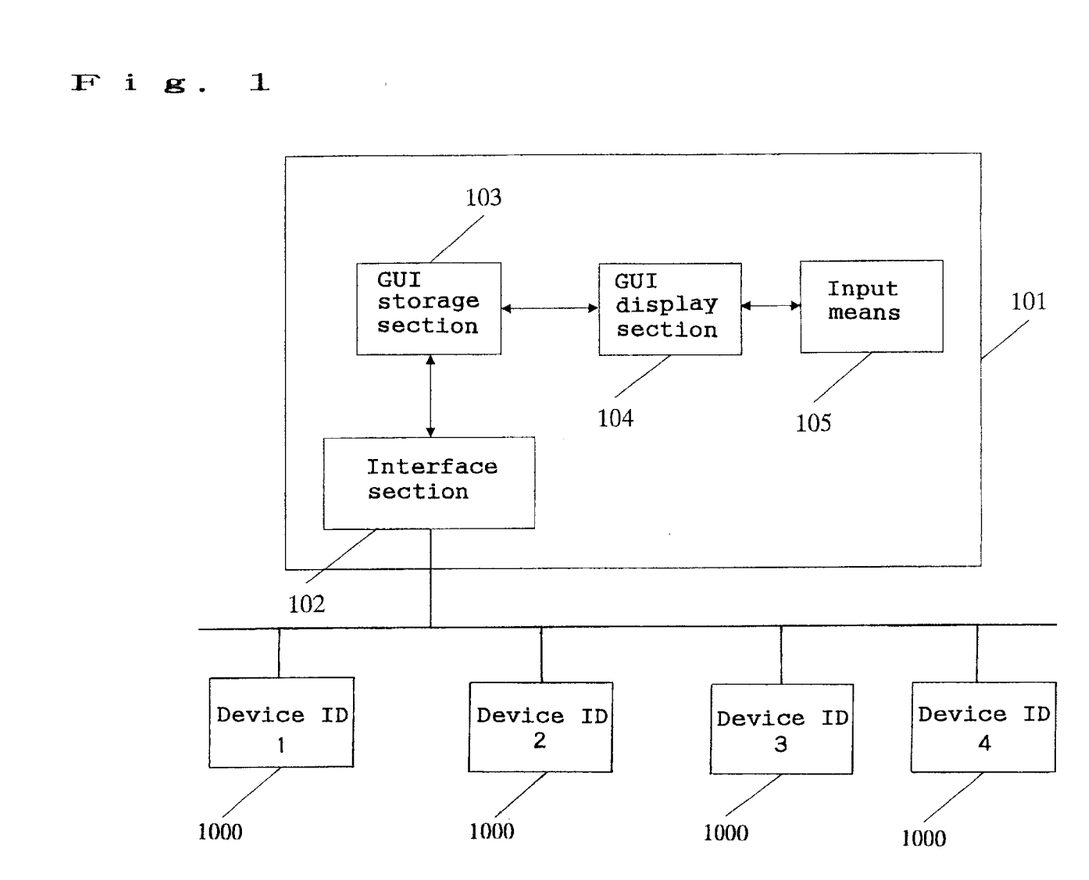

FIG. 1 is a block diagram of the controller according to the first embodiment of the present invention. In FIG. 1, reference numeral 101 represents the controller, reference numeral 102 represents an interface section, reference numeral 103 represents a GUI storage section, reference numeral 104 represents a GUI display section, and reference numeral 105 represents input means. Reference numeral 1000 represents various kinds of AV devices connected through the interface section 102.

Figure 8:
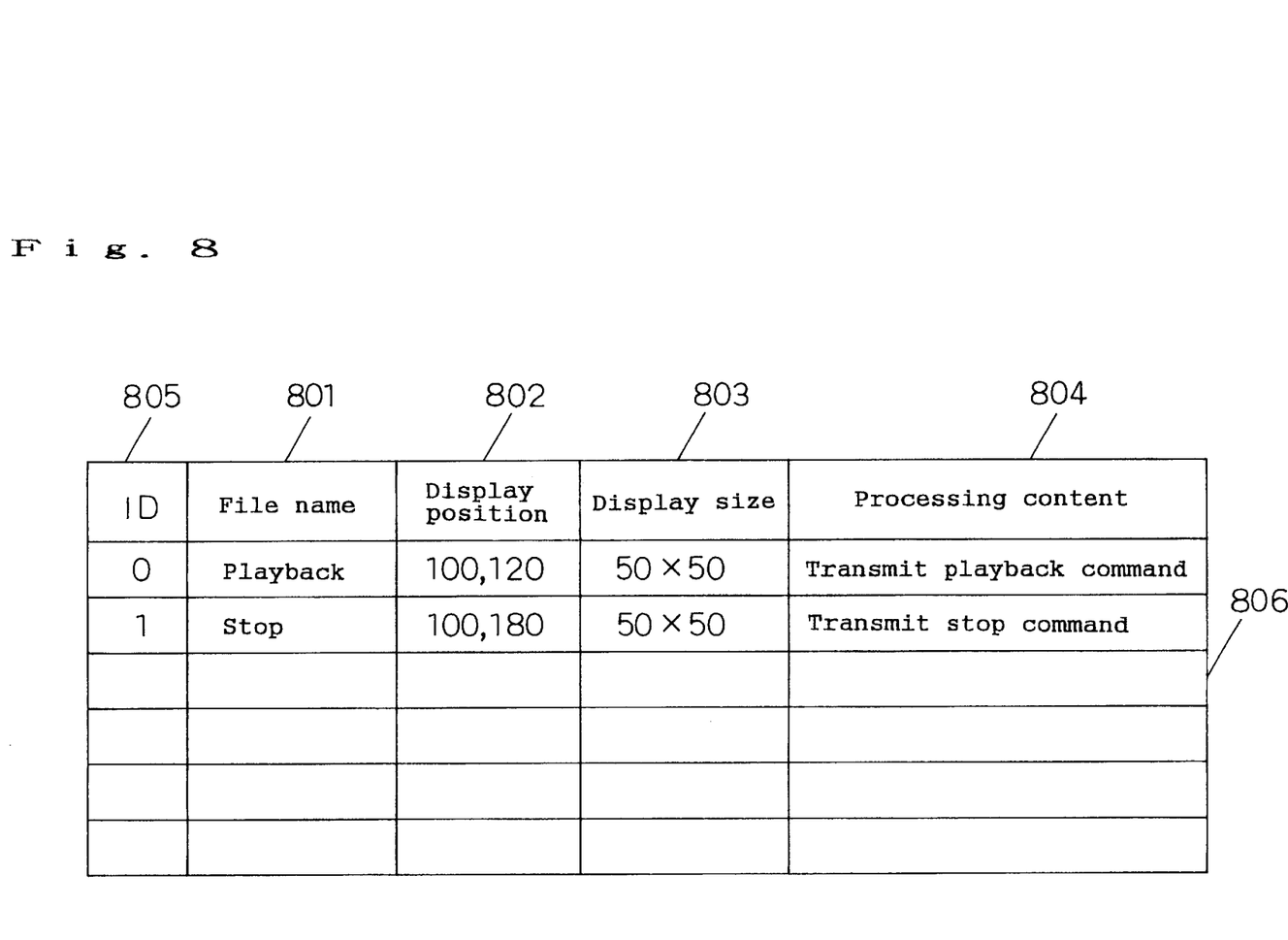

FIG. 8 shows an example of the configuration of the GUI information stored in the GUI storage section 103. In FIG. 8, reference numeral 801 represents the file name of the image data of a GUI part, reference numeral 802 represents the display position of the GUI part, reference numeral 803 represents the display size of the GUI part, reference numeral 804 represents the processing content, reference numeral 805 represents the identifier of the GUI part, and reference numeral 806 represents a GUI part storage table.

The operation of the controller of the embodiment structured as described above will be described.

The controller 101 first obtains the GUI information by way of the interface section 102 from the ROM of the controlled AV device on the network. When the controlled device is a VCR, the GUI information includes the image data of GUI parts such as playback, stop and rewind, the file names 801 thereof, the display position data 802 of the image data, the display size data 803 of the image data, and the description of the processing 804 performed when the displayed GUI parts are selected.

The controller 101 stores the GUI information into the GUI part storage table 806 in the GUI storage section 103. When the GUI information is stored into the GUI part storage table 806, the GUI part identifiers 805 are uniquely assigned.

The GUI display section 104 displays GUI parts with reference to the file names 801, the display position data 802 and the display size data 803 of the GUI parts in the GUI storage section 103. The GUI display section 104 stores the identifiers 805 of the displayed GUI parts.

The user can select a GUI part displayed on the GUI display section 104 by moving a movement button on the input means 105 within the selectable GUI parts and using an enter button on the input means 105.

Based on the identifier 805 of the selected GUI part, the GUI display section 104 searches for the corresponding GUI part in the GUI part storage table 806, and decides the processing with reference to the accompanying processing content. When the processing is decided, a command such as playback, stop or rewind is transmitted by way of the interface section 102 to the controlled device, so that the controlled device starts the processing.

(Second Embodiment)

Hereinafter, a graphical user interface method according to a second embodiment of the present invention will be described with reference to the drawings.

Figure 3:
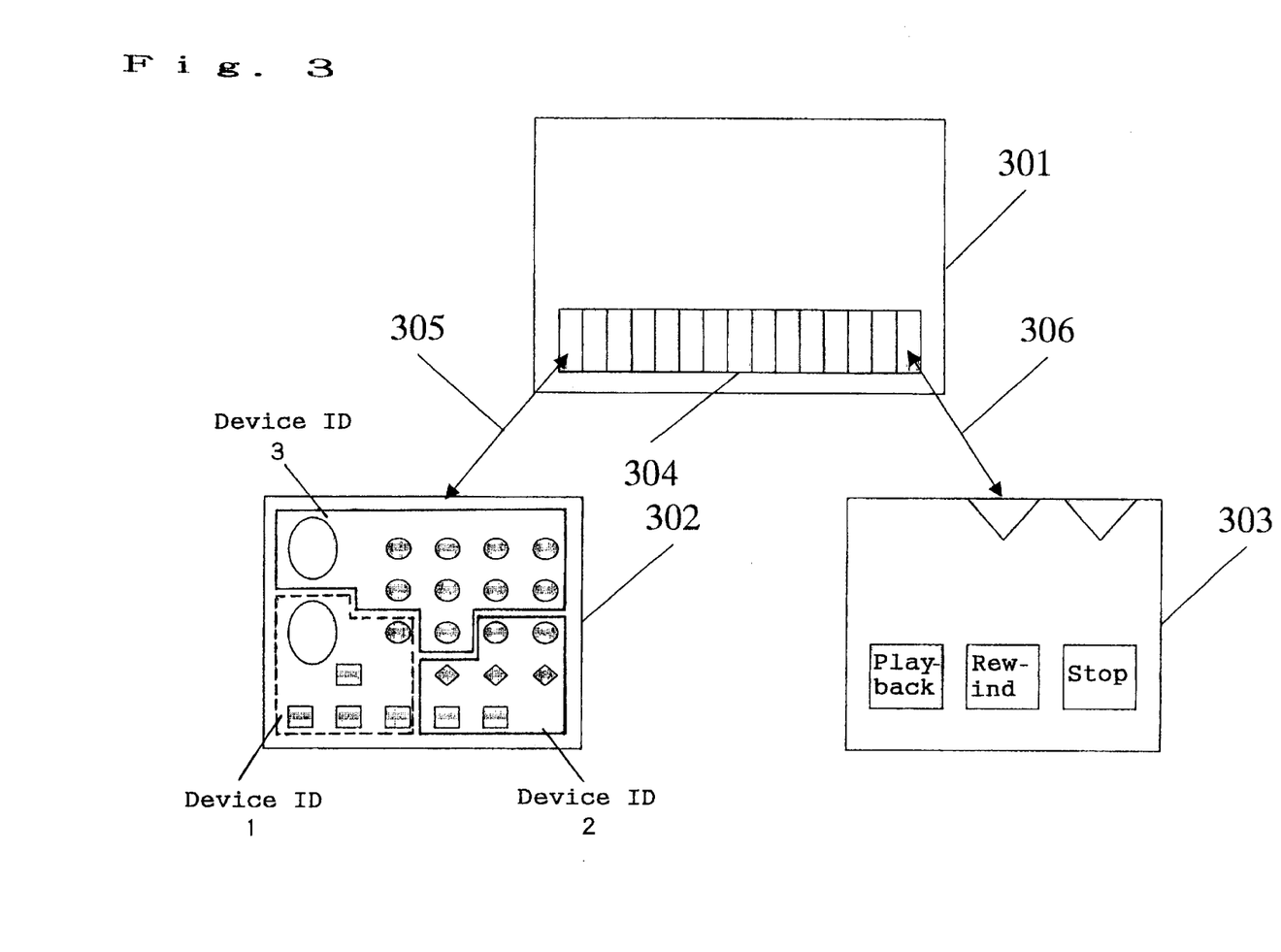

FIG. 3 shows an example of the graphical user interface method according to the second embodiment of the present invention. In FIG. 3, reference numeral 301 represents a level setting screen, reference numeral 302 represents a most zoomed out GUI display screen, and reference numeral 303 represents a most zoomed in GUI display screen.

On the level setting screen 301, the user changes the display level of the GUI for controlling AV devices by selecting a level from a GUI level selection bar 304. In order that as many GUI parts as possible are displayed on the screen, a lowest level 305 is selected to change the display to the display 302 of the whole of the GUI. In order that as few GUI parts as possible are displayed being enlarged, a highest level 306 is selected to change the display to the local display 303 of the GUI.

In this example, when the display is enlarged, some of the parts are enlarged, and with respect to the selection, that is, the display positions of the enlarged parts, in the case of a VTR, the zoom-in and zoom-out positions are allocated to the level selection bar 304 so that the playback and the stop parts which are frequently used control GUI parts are in the center. Thus, the user's convenience is sufficiently considered.

Figure 2:
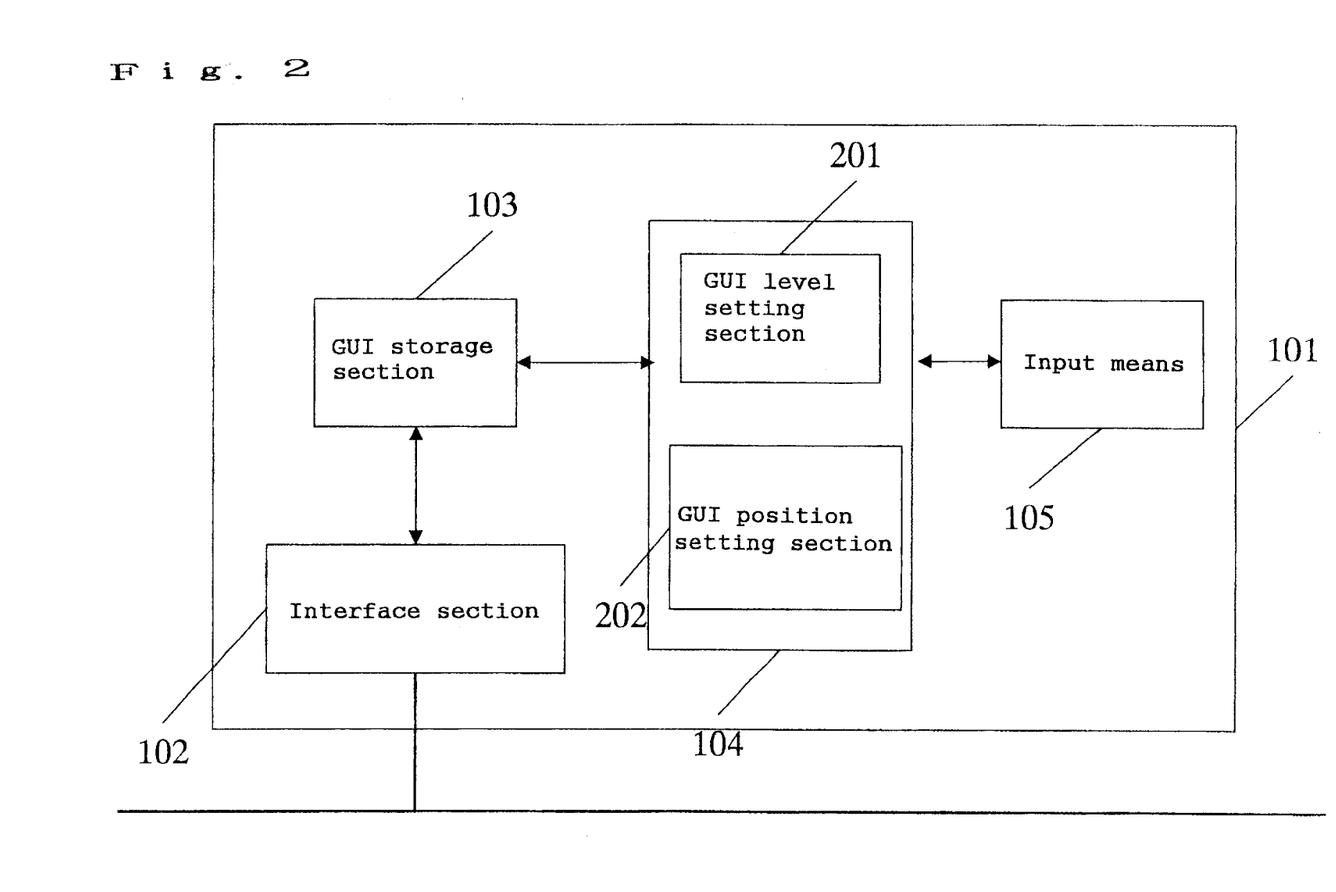

FIG. 2 is a block diagram of a controller when the graphical user interface method according to the second embodiment of the present invention is carried out. In FIG. 2, in addition to the elements of FIG. 1, reference numerals 201 in the GUI display section 104 represent a GUI level setting section, and reference numerals 202 in the GUI display section 104 represent a GUI position setting. The operation of the controller structured as described above will be described.

The GUI displays GUI parts on the GUI display section 104 based on the GUI information obtained in the first embodiment. The GUI display section 104 is capable of displaying the level setting screen in zoom in and zoom out of the GUI display. On the level setting screen, the levels, the parts to be displayed when the levels are selected and the display coordinates thereof are supplied to the GUI position setting section 202.

The GUI level, the parts displayed in correspondence therewith and the positions thereof can be changed by the user. Specifically, on the level setting screen 301, the user selects an arbitrary GUI level from the GUI level selection bar 304 with the enter button existing on the input means 105, and then, on the GUI display screen, the user moves a displayed GUI part with the movement button existing on the input means 105, and decides the display position by depressing the enter button. The result is recorded into the GUI level setting section 201 and the GUI position setting section 202.

(Third Embodiment)

Hereinafter, a graphical user interface method according to a third embodiment of the present invention will be described with reference to the drawings.

Figure 5:
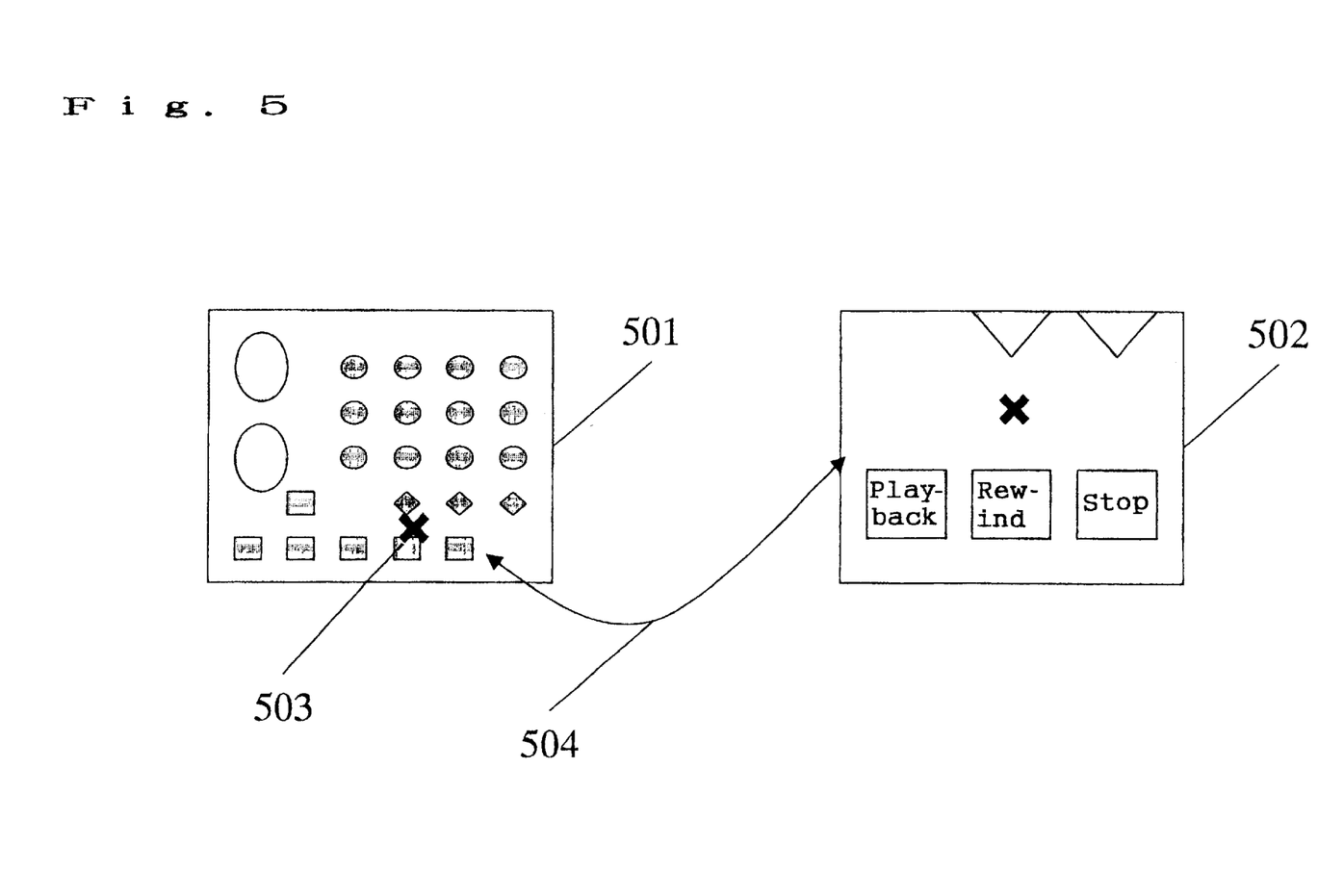

FIG. 5 shows an example of the graphical user interface method according to the third embodiment of the present invention. In FIG. 5, reference numeral 501 represents a most zoomed out GUI display screen, and reference numeral 502 represents a most zoomed in GUI display screen.

On the zoomed out GUI display 501, the user can continuously progress 504 the zoom in or zoom out of the GUI display by freely selecting the position by moving a cursor 503, and continuously increasing or decreasing the GUI level at the same time. In the example of FIG. 5, the user indicates a desired position of the GUI display 501 with the cursor 503 and at the same time, zooms in the GUI display to the GUI display 502 with level selecting means 401.

Figure 4:
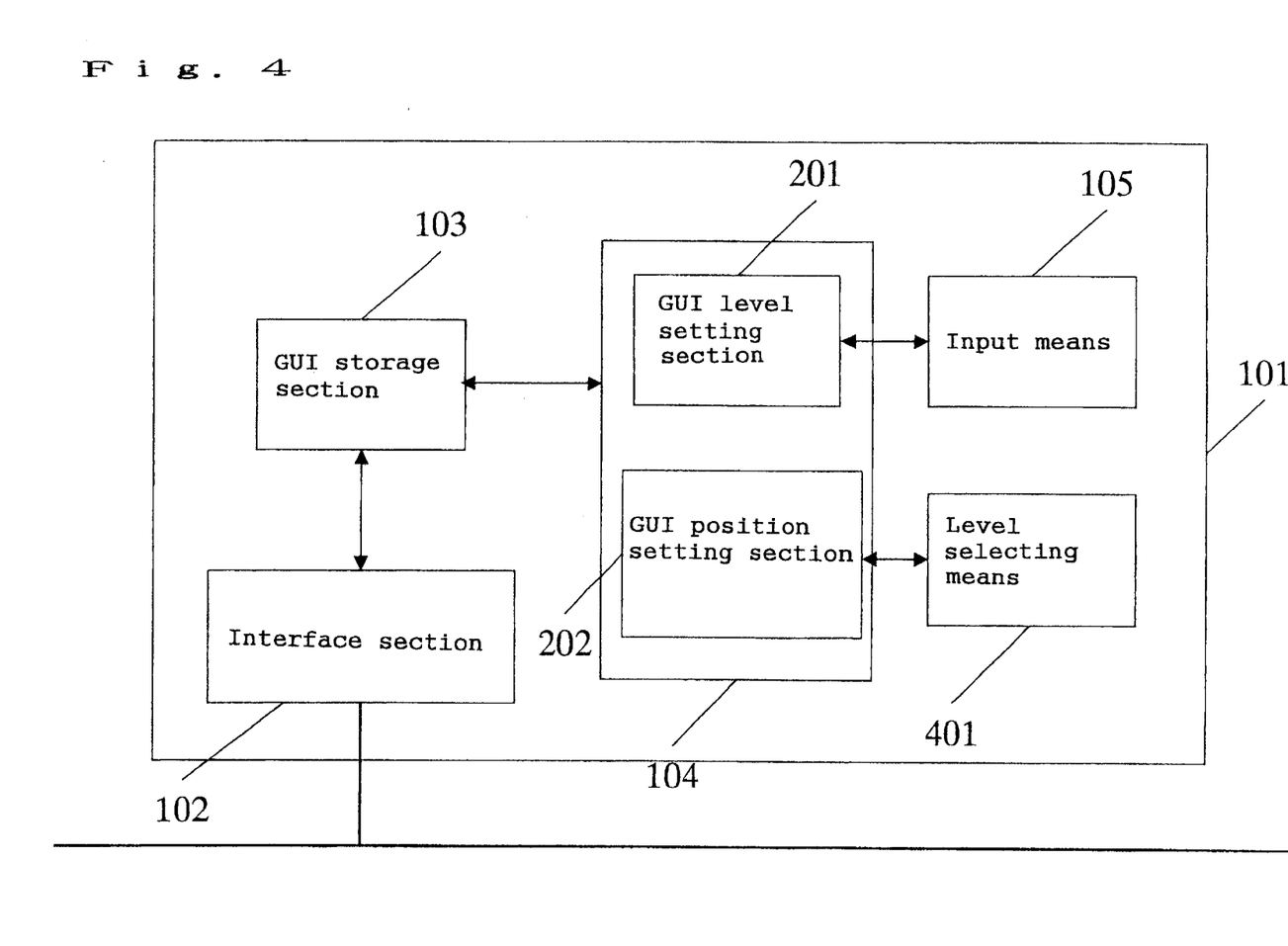

FIG. 4 is a block diagram of a controller when the graphical user interface method according to the third embodiment of the present invention is carried out. In FIG. 4, in addition to the elements of the controller of FIG. 2, reference numeral 401 represents the level selecting means. The operation of the controller structured as described above will be described.

The GUI displays GUI parts on the GUI display section 104 based on the GUI information obtained in the first embodiment. The cursor 503 is displayed on the GUI display section 104, and the GUI display section 104 can obtain the position information of the cursor 503.

The user moves the cursor 503 with the movement button on the input means 105 and specifies the zoom-in or zoom-out position, and the coordinate value of the position is recorded into the GUI position setting section 202. At the same time, the user sets the degree of zoom in or zoom out with the level selecting means 401, and the numerical value of the GUI display level is recorded into the GUI level setting section 201.

The GUI display section 104 is capable of continuously changing the displayed GUI based on the GUI information stored in the GUI storage section 103, the selected GUI display level and the GUI display position.

(Fourth Embodiment)

Hereinafter, a graphical user interface method according to a fourth embodiment of the present invention will be described with reference to the drawings.

Figure 7:
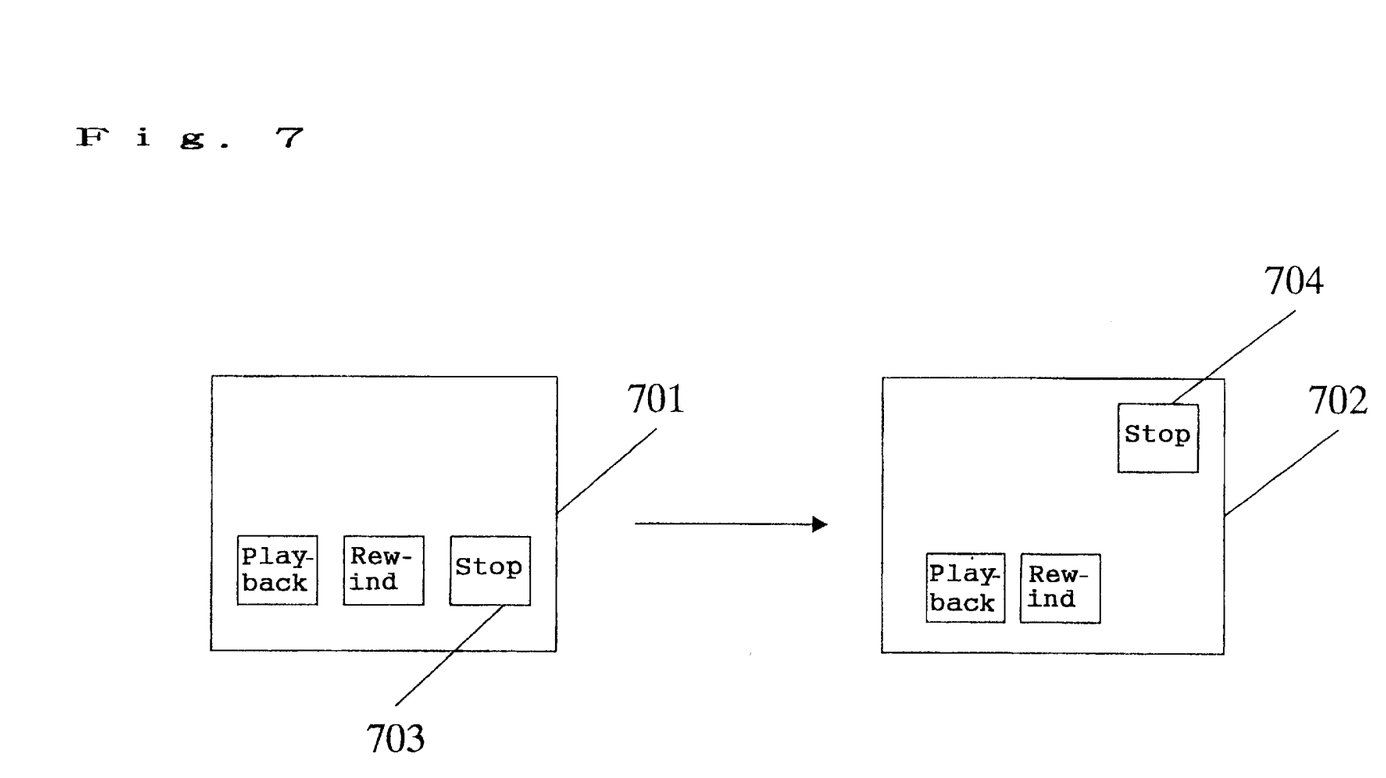

FIG. 7 shows an example of the graphical user interface method according to the fourth embodiment of the present invention. In FIG. 7, reference numeral 701 represents a GUI display screen before a GUI part is moved, reference numeral 702 represents a GUI display screen after a GUI part is moved, reference numeral 703 represents a GUI part before moved, and reference numeral 704 represents a GUI part after moved.

On the GUI display screen 701, the user can change the position of the GUI part 704 by selecting and moving the GUI part 703. The position is stored in a GUI part position storage section 601, and the GUI display screen 702 reflects the position change.

Figure 6:
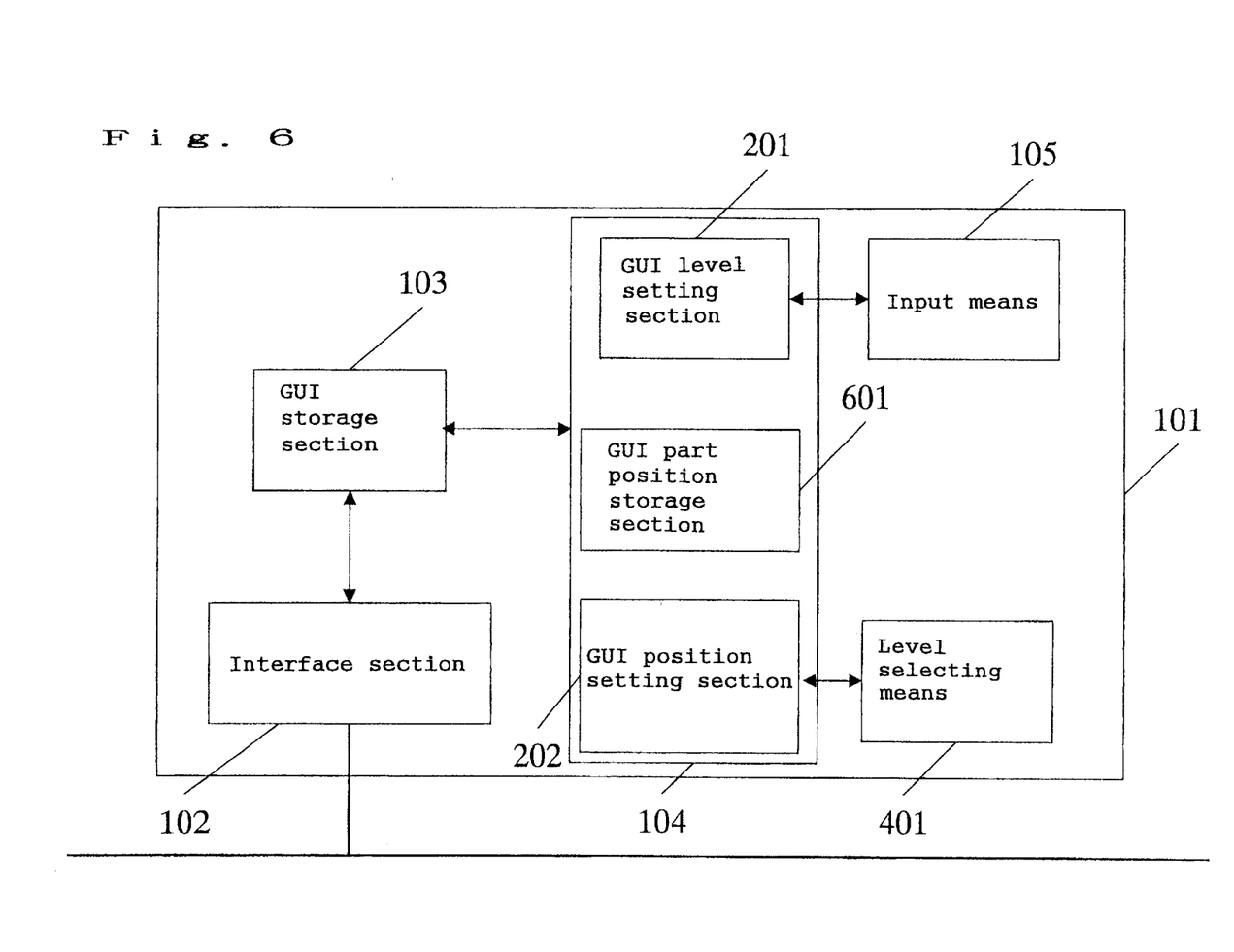

FIG. 6 is a block diagram of a controller when the graphical user interface method according to the fourth embodiment of the present invention is carried out. In FIG. 6, in addition to the elements of the controller of FIG. 4, reference numeral 601 in the GUI display section 104 represents the GUI part position storage section. The operation of the controller structured as described above will be described.

GUI parts are displayed on the GUI display section 104 based on the GUI information obtained in the first embodiment. The cursor 503 is displayed on the GUI display section 104, and the GUI display section 104 obtains the position information of the cursor 503. The user moves the cursor 503 with the movement button on the input means 105, and depresses the enter button on the input means 105 when the cursor 503 is on a specific GUI part. By doing this, the user selects the specific GUI part.

Under this state, the user moves the position of the GUI part with the input means 501 and depresses the enter button once again, so that the GUI part is moved to the new position. The new position of the GUI part is stored into the GUI part position storage section 601. That is, the relative positional interrelationship among the GUI parts is newly stored.

The GUI display section 104 changes the displayed GUI based on the GUI part position recorded in the GUI part position storage section 601 in addition to the GUI information stored in the GUI storage section 103, the GUI display level stored in the GUI level setting section 201 and the GUI display position recorded in the GUI position setting section 202 as described above.

(Fifth Embodiment)

Hereinafter, a graphical user interface method according to a fifth embodiment of the present invention will be described with reference to the drawings.

Figure 9:
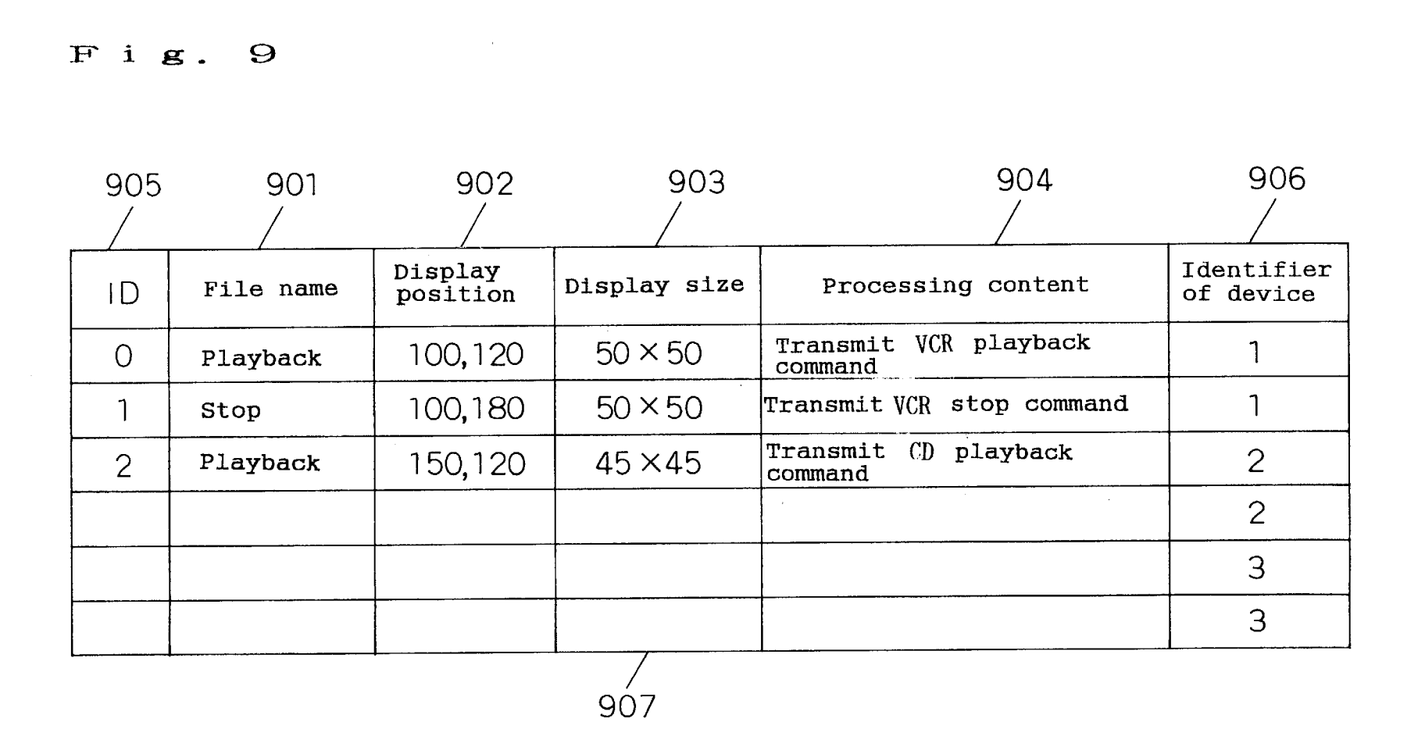

FIG. 9 shows an example of the configuration of the GUI information stored in the GUI storage section 103. In FIG. 9, reference numeral 901 represents the file name of the image data of a GUI part, reference numeral 902 represents the display position of the GUI part, reference numeral 903 represents the display size of the GUI part, reference numeral 904 represents the processing content, reference numeral 905 represents the identifier of the GUI part, and reference numeral 906 represents the identifier of a device, and reference numeral 907 represents a GUI part storage table.

The GUI information is obtained by way of the interface section from the ROM of a plurality of controlled AV devices on the network. The GUI information includes the image data of GUI parts and the file names 901 thereof, the display position data 902 of the image data, the display size data 903 of the image data, the processing 904 performed when the displayed GUI parts are selected, and the device identifier 906 for identifying a plurality of AV devices. The GUI information is stored into the GUI part storage table 907 in the GUI storage section 103.

When the GUI information is stored into the GUI part storage table 907, the GUI part identifiers 905 are uniquely assigned. The GUI display section 104 displays GUI parts with reference to the GUI part storage table 907.

In order to prevent the GUI parts of a plurality of AV devices from overlapping one another in the initial display when the GUI information is obtained, an area in the display screen is obtained for each AV device and the GUI parts are displayed. That is, in a case where two kinds of AV devices, a VCR and a CD are present, as the display position 902 of the GUI part of the VCR, the value obtained by dividing the display position data obtained from the ROM by 2 is stored in the GUI part storage table 907, and as the display size 903, the value reduced to a quarter is stored. On the other hand, as the display position 902 of the GUI part of the CD, the sum of the value obtained by dividing the display position data obtained from the ROM by 2 and the value shifted by half the screen in a lateral direction of the screen is stored in the GUI part storage table 907, and as the display size 903, the value reduced to a quarter is stored.

When a device is newly added to the network, the displayed GUI parts can also be prevented from overlapping one another by re-calculating the data of the display position 902 and the data of the display size 903 already stored in the GUI part storage table 907.

In a case where the display screen is divided into a plurality of areas and the GUI parts of a plurality of AV devices are displayed in each area respectively as described above, when the sizes of the GUI parts are not proportionally reduced in area but, for example, the screen is divided into 4/1 areas and the GUI parts are displayed in one of the areas, it is desirable to display the GUI parts so as to be largish within the limit that is not larger than the area, such that the size is preset not to ¼ but to ⅓.

The areas into which the screen is divided are not necessarily square or rectangular, but may be circular or of a bent shape, or the like.

It is also desirable that the colors or the like of the parts be different among the devices so that a plurality of AV devices can be distinguished.

When a GUI part is selected, the corresponding GUI part in the GUI part storage table 907 is searched for based on the selected GUI part identifier 905, and the processing is decided with reference to the accompanying processing content. When the process is decided, a command is transmitted by way of the interface section to the device described in the device identifier 906, and the device to which the command is transmitted starts the processing.

In the graphical user interface method of the fifth embodiment, since the method of the fourth embodiment can be applied to the GUI display of a plurality of AV devices, when the GUI parts of a plurality of devices are intermixed in the GUI display section, the GUI parts can be moved to respective positions desired by the user.

The present invention is a medium holding a program and/or data for allowing a computer to perform all or some of the functions of all or some of the above-described means of the present invention, and is a computer-readable medium in which the read out program and/or data performs the functions in cooperation with the computer.

The data includes the data configuration, the data format, the data kind, and so on.

The medium includes recording media such as ROMs, transmission media such as the Internet and transmission media such as light, radio waves and sound waves.

The holding medium includes, for example, recording media where a program and/or data is recorded, transmission media for transmitting a program and/or data, and the like.

Being processable by a computer indicates, for example, being readable by a computer in the case of recording media such as ROMs, and includes that the program and/or data to be transmitted can be handled by a computer as a result of transmission in the case of transmission media.

An information aggregate includes, for example, software such as a program and/or data.

As described above, according to the present invention, since the GUI information of the AV devices on the network can be obtained, the AV devices can be easily controlled with one controller.

Moreover, according to the present invention, since the display level of zoom in and zoom out of the GUI can be changed, it is possible to serve all the needs from the need of a user requiring GUI parts for minimum necessary control to the need of a user requiring a multiplicity of GUI parts for efficiently using a multiplicity of functions.

Moreover, according to the present invention, since the display level of zoom in and zoom out of the GUI can be continuously changed, in devices with a limited display space such as portable terminals, the GUI display can be used without any difference from when it is provided on a large screen. Moreover, it is possible to serve all the needs from the need of a user requiring GUI display for minimum necessary control to the need of a user requiring a multiplicity of GUI displays for efficiently using a multiplicity of functions.

Moreover, according to the present invention, since the user can freely customize the layout of the GUI, by combining the zoom-in function and the zoom-out function at the same time, an AV device controller serving users having any purposes can be constructed.

Moreover, according to the present invention, since the GUI information of a plurality of AV devices on the network can be obtained, the GUIs of a plurality of AV devices can be simultaneously displayed with one controller.

What is claimed is:

1. An AV device controller for controlling networked devices with a graphical user interface (GUI), comprising:
   an interface section for obtaining GUI information from a controlled device;
   a GUI storage section for storing the GUI information;
   a GUI display section for displaying the GUI parts;
   input means for selecting the GUI parts; and
   a GUI part position storage section capable of freely changing a relative positional relationship among the GUI parts displayed on said display section and of storing the relationship, wherein
   a user can customize the GUI,
   the GUI parts are GUI controlling parts for controlling the networked devices, and
   by selecting a GUI controlling part displayed on said GUI display section with said input means, predetermined processing assigned to the GUI controlling part is started.

2. An AV device controller according to claim 1, wherein said GUI parts are displayed so as not to overlap each other on a screen of said GUI display section for each device.

3. An AV device controller according to claim 2, wherein said screen is divided into areas and the GUI parts of the devices are displayed in the areas so that the GUI parts of one device are displayed in one area.

4. An AV device controller according to claim 3, wherein the GUI parts of one device can be distinguished from the GUI parts of another device by their colors by a user.

5. An AV device controller according to claim 1, wherein when a predetermined GUI part is specified with said input means, the processing corresponding to the GUI part is performed.

6. An AV device controller according to claim 1, wherein said GUI storage means is capable of storing the GUI information so that a plurality of AV devices can be distinguished, and the GUI parts of a plurality of AV devices controlled by said GUI display section can be displayed so as to be intermixed.

7. A medium holding a program and/or data for allowing a computer to perform all or some functions of all or some of said means of the present invention according to claim 6 said medium being processable by a computer.

8. An information aggregate being a program and/or data for allowing a computer to perform all or some functions of all or some of said means of the present invention according to claim 6.

9. An AV device controller for controlling networked devices with a graphical user interface (GUI), comprising:
   an interface section for obtaining GUI information from a controlled device;
   a GUI storage section for storing the GUI information;
   a GUI display section for displaying the GUI parts; and
   input means for selecting the GUI parts,
   a GUI part position storage section capable of freely changing a relative positional relationship among the GUI parts displayed on said display section and of storing the relationship, wherein a user can customize the GUI,
   wherein by selecting a GUI part displayed on said GUI display section with said input means, predetermined processing assigned to the GUI part is started,
   wherein said GUI display section comprises a GUI level setting section for performing zoom-in setting to provide screen display so that the GUI parts are partly enlarged and zoom-out setting to display GUI parts in the whole of the screen, and a GUI position setting section for deciding display positions of the GUI parts of the zoom-in or zoom-out setting corresponding to a display level of the GUI parts.

10. An AV device controller according to claim 9, comprising level selecting means capable of continuously selecting the display level of the GUI parts, and selecting means for selecting display positions of the GUI parts.

* * * * *

UNITED STATES PATENT AND TRADEMARK OFFICE
CERTIFICATE OF CORRECTION

PATENT NO. : 6,765,590 B1
DATED : July 20, 2004
INVENTOR(S) : Watahiki et al.

It is certified that error appears in the above-identified patent and that said Letters Patent is hereby corrected as shown below:

Title page,
Item [56] References Cited, FOREIGN PATENT DOCUMENTS, replace "JP 8-277341" with -- JP 8-227341 --.

Signed and Sealed this

Seventh Day of June, 2005

JON W. DUDAS
*Director of the United States Patent and Trademark Office*